United States Patent
Wang et al.

(10) Patent No.: US 11,715,836 B2
(45) Date of Patent: Aug. 1, 2023

(54) FUEL CELL CONTROL SYSTEM FOR VEHICLES

(71) Applicant: FORD GLOBAL TECHNOLOGIES, LLC, Dearborn, MI (US)

(72) Inventors: Hao Wang, Ann Arbor, MI (US); Zeng Qiu, Grosse Pointe Woods, MI (US); Rajit Johri, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 17/340,924

(22) Filed: Jun. 7, 2021

(65) Prior Publication Data

US 2022/0399554 A1    Dec. 15, 2022

(51) Int. Cl.
*H01M 8/04* (2016.01)
*H01M 8/0438* (2016.01)
*H01M 8/04746* (2016.01)
*B60L 58/30* (2019.01)

(52) U.S. Cl.
CPC ... *H01M 8/04395* (2013.01); *H01M 8/04425* (2013.01); *H01M 8/04432* (2013.01); *H01M 8/04753* (2013.01); *H01M 8/04776* (2013.01); *H01M 8/04783* (2013.01); *B60L 58/30* (2019.02); *H01M 2250/20* (2013.01)

(58) Field of Classification Search
CPC ......... H01M 8/04395; H01M 8/04425; H01M 8/04432; H01M 8/04753; H01M 8/04776; H01M 8/04783; H01M 2250/20
USPC ..................................................... 429/443
See application file for complete search history.

(56) References Cited

U.S. PATENT DOCUMENTS

| | | | |
|---|---|---|---|
| 8,962,208 B2 | 2/2015 | Mussro et al. | |
| 9,905,867 B2 | 2/2018 | Asai et al. | |
| 2007/0184321 A1* | 8/2007 | Mirsch | H01M 8/04089 429/437 |
| 2015/0288007 A1 | 10/2015 | Gangwar et al. | |
| 2019/0148752 A1* | 5/2019 | Bozzolo | H01M 8/04089 429/443 |
| 2019/0368427 A1* | 12/2019 | Iwata | F02D 41/04 |

OTHER PUBLICATIONS

Daud, W. R. W., et al. "PEM fuel cell system control: A review." Renewable Energy 113 (2017): 620-638.
Qiu, Zeng, et al. "Composite adaptive internal model control and its application to boost pressure control of a turbocharged gasoline engine." IEEE Transactions on Control Systems Technology 23.6 (2015): 2306-2315.

* cited by examiner

*Primary Examiner* — James M Erwin
(74) *Attorney, Agent, or Firm* — David B Kelley; Brooks Kushman P.C.

(57) ABSTRACT

A vehicle includes a fuel cell having an air inlet port and an air outlet port and an air supply system having a compressor connected in fluid communication with the inlet port and a throttle valve connected in fluid communication with the outlet port. A controller is programmed to change a position of the throttle valve based on a target mass air flow, a measured mass air flow, a measured pressure, and the position of the throttle valve.

18 Claims, 3 Drawing Sheets

FUEL CELL CONTROL SYSTEM FOR VEHICLES

TECHNICAL FIELD

This disclosure relates to vehicles having a fuel cell power plant and more specifically to controls and methods for regulating the air flow rate and air pressure of a cathode.

BACKGROUND

The hydrogen fuel cell, and in particular the proton exchange membrane fuel cell (PEMFC), is one potential power source for automobiles and stationary applications. The reaction in a PEMFC involves hydrogen molecules splitting into hydrogen ions and electrons at the anode, while protons re-combine with oxygen and electrons to form water and release heat at the cathode. Typically, a proton exchange membrane is used as a proton conductor in a PEMFC. A catalyst layer containing, for example, platinum and/or a platinum alloy is used to catalyze the electrode reactions. A gas diffusion layer, which may include a microporous layer and a gas diffusion backing layer, is used to transport reactant gases and electrons as well as remove product water and heat.

SUMMARY

According to an embodiment, a vehicle includes a fuel cell having an air inlet port and an air outlet port and an air supply system having a compressor connected in fluid communication with the inlet port and a throttle valve connected in fluid communication with the outlet port. A controller is programmed to change a position of the throttle valve based on a target mass air flow, a measured mass air flow, a measured pressure, and the position of the throttle valve.

According to another embodiment, a vehicle includes a fuel cell having an air inlet port and an air outlet port and an air supply system having a compressor connected in fluid communication with the inlet port and a throttle valve connected in fluid communication with the outlet port. A controller is programmed to command a speed to the compressor based on (i) a feedforward component derived from a measured mass air flow and a target pressure and (ii) a feedback component derived from an error between the target pressure and a measured pressure, and to command a valve position to the throttle valve based on a dynamic feedforward component derived from a summation of (i) an error between a target mass air flow and a first estimated mass air flow and (ii) a second estimated mass air flow, wherein the first estimated mass air flow is based on the measured mass air flow, and the second estimated mass air flow is based on the measured pressure and the valve position.

According to yet another embodiment, a method of controlling air flow through a cathode side of a fuel cell includes commanding a speed to a compressor that circulates air through the cathode, the speed being based on (i) a feedforward component derived from a measured mass air flow and a target pressure and (ii) a feedback component derived from an error between the target pressure and a measured pressure; and commanding a valve position to a throttle valve, that controls mass air flow through the cathode side, based on a dynamic feedforward component derived from a summation of (i) an error between a target mass air flow and a first estimated mass air flow and (ii) a second estimated mass air flow, wherein the first estimated mass air flow is based on the measured mass air flow, and the second estimated mass air flow is based on the measured pressure and the valve position.

According to a further embodiment, a vehicle includes a fuel cell having an air inlet port and an air outlet port and an air supply system having a compressor connected in fluid communication with the inlet port and a throttle valve connected in fluid communication with the outlet port. A controller is programmed to change a position of the throttle valve based on a summation of (i) an error between a target mass air flow and a first estimated mass air flow and (ii) a second estimated mass air flow, wherein the first estimated mass air flow is based on a measured mass air flow, and the second estimated mass air flow is based on a measured pressure and the position of the throttle valve.

DETAILED DESCRIPTION

Figure 1:
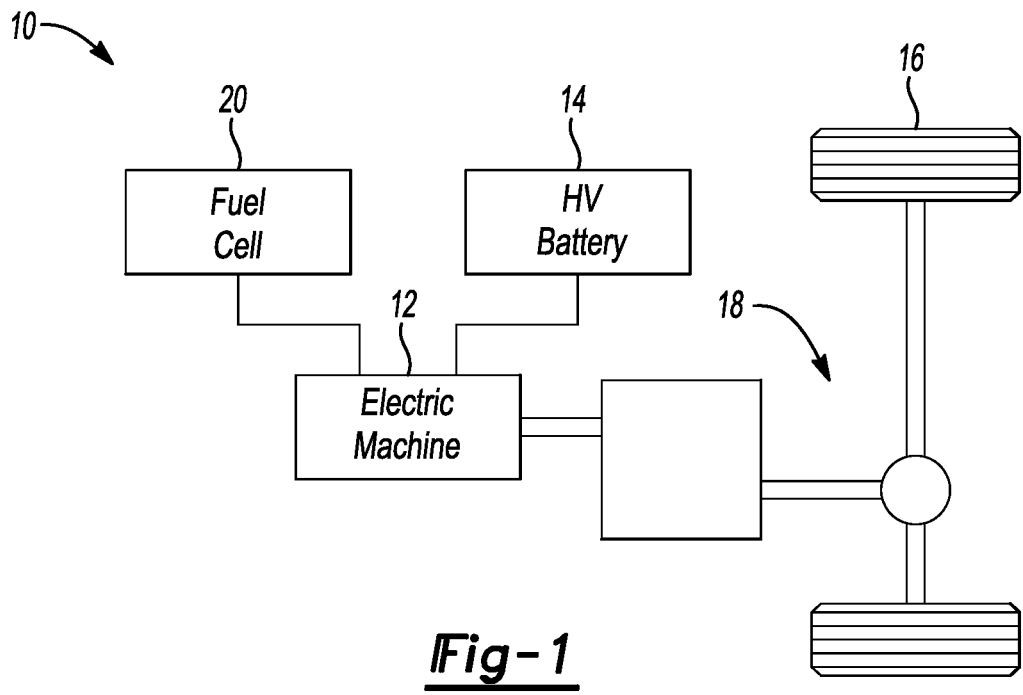
FIG. 1 is a schematic of a fuel cell vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

PEMFC are a popular fuel cell choice for automotive vehicles. The PEMFC generally includes a proton exchange membrane (PEM). The anode and the cathode typically include finely divided catalytic particles, usually platinum, supported on carbon particles and mixed with an ionomer. The catalytic mixture is deposited on opposing sides of the membrane. The combination of the anode-catalytic mixture, the cathode-catalytic mixture, and the PEM form a coated catalyst membrane electrode (CCM). In order to facilitate the transport of reactant gases to and remove the excessive water and heat from the catalytic mixture, a gas diffusion layer (GDL), which may include a microporous layer and a carbon-fiber-based gas diffusion backing layer, may be applied on either side of the CCM to form a membrane electrode assembly (MEA). GDLs also provide mechanical support for the soft goods including the PEM and catalytic mixtures.

MEAs are sandwiched between bipolar plates to form unit cells. The bipolar plates typically include an anode side and a cathode side. Anode fuel flow channels are provided on the anode side of the bipolar plates that allow the anode gas to flow to the anode side of the MEA. Cathode oxidant flow channels are provided on the cathode side of the bipolar plates that allow the cathode gas to flow to the cathode side of the MEA. Coolant channels may be disposed between the anode and cathode sides of the bipolar plates to thermally regulate the fuel cell.

Several unit cells are typically combined in a fuel cell stack to generate the desired power. For example, the stack may include two-hundred or more unit cells arranged in series. The fuel cell stack receives a cathode reacting gas, typically a flow of air forced through the stack by a compressor. Not all the oxygen is consumed by the stack and some of the air is output as a cathode exhaust gas that may include water as a stack byproduct. The fuel cell stack also receives an anode hydrogen reacting gas that flows into the anode side of the stack.

Referring to FIG. 1, a vehicle 10 includes a fuel-cell system 19 for providing electrical power to at least one electric machine 12. The vehicle 10 may also include a traction battery 14 electrically connected to the fuel-cell system 19 and the electric machine 12. The electric machine 12 is connected to the driven wheels 16 via a drivetrain 18. During operation of the vehicle 10, hydrogen fuel and air are fed into a fuel cell of the system 19 creating electrical power. The electric machine 12 receives the electrical power as an input, and outputs torque for driving the wheels 16 to propel the vehicle 10.

Figure 2:
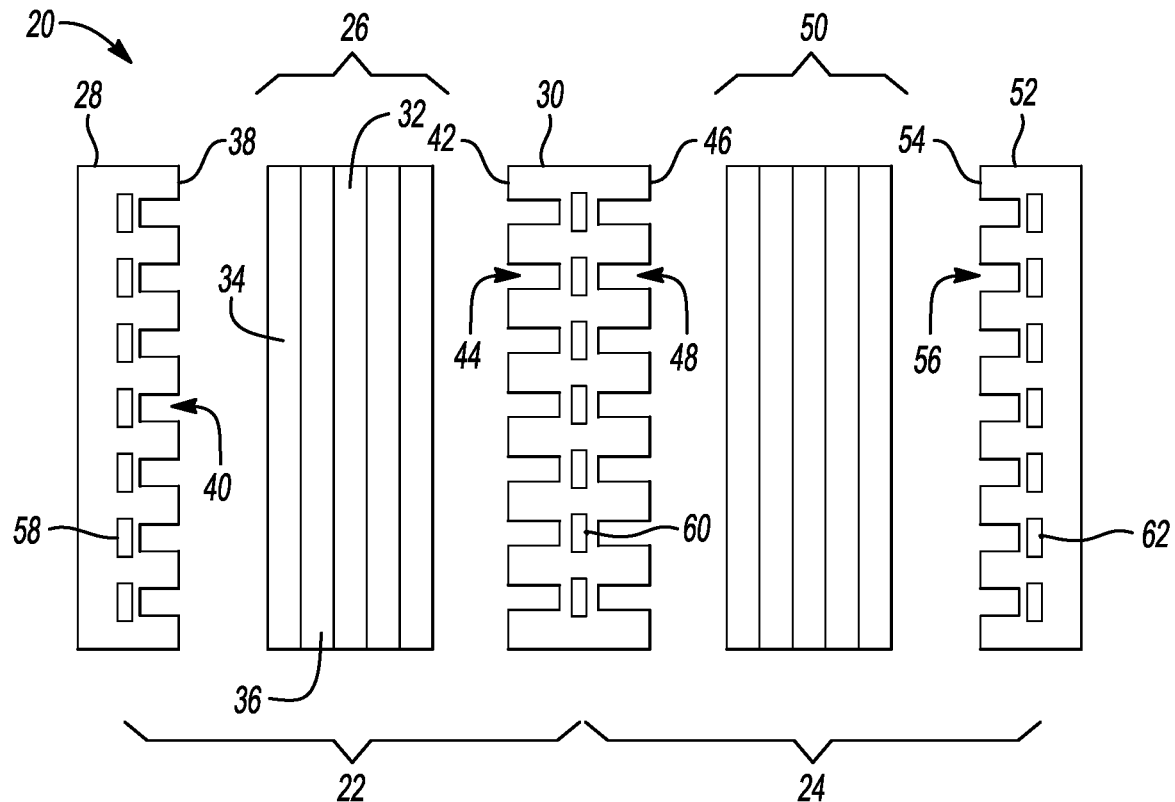
FIG. 2 is an exploded view of a proton exchange membrane fuel cell stack.

Referring to FIG. 2, an example fuel cell 20 includes two unit cells 22, 24 stacked together. The two-cell stack is merely an example and the fuel cell 20 may include dozens or hundreds of stacked unit cells. The first unit cell 22 includes an MEA 26 sandwiched between a first end plate 28 and a bipolar plate 30. The MEA 26 is comprised of a plurality of different layers including a PEM 32, a pair of gas diffusion layers (GDL) 34 and a pair of catalyst layers 36. The endplate 28 includes an anode side 38 defining a plurality of flow paths 40 for the hydrogen fuel. The bipolar plate 30 includes a cathode side 42 defining a plurality of flow paths 44 for air and an anode side 46 defining a plurality of flow paths 48 for hydrogen fuel for the second unit cell 24. A second MEA 50 is sandwiched between the bipolar plate 30 and a last endplate 52. The last endplate 52 includes a cathode side 54 defining a plurality of flow paths 56 for air. The coolant channels 58, 60, 62 are configured to circulate coolant, such as ethylene glycol.

Figure 3:
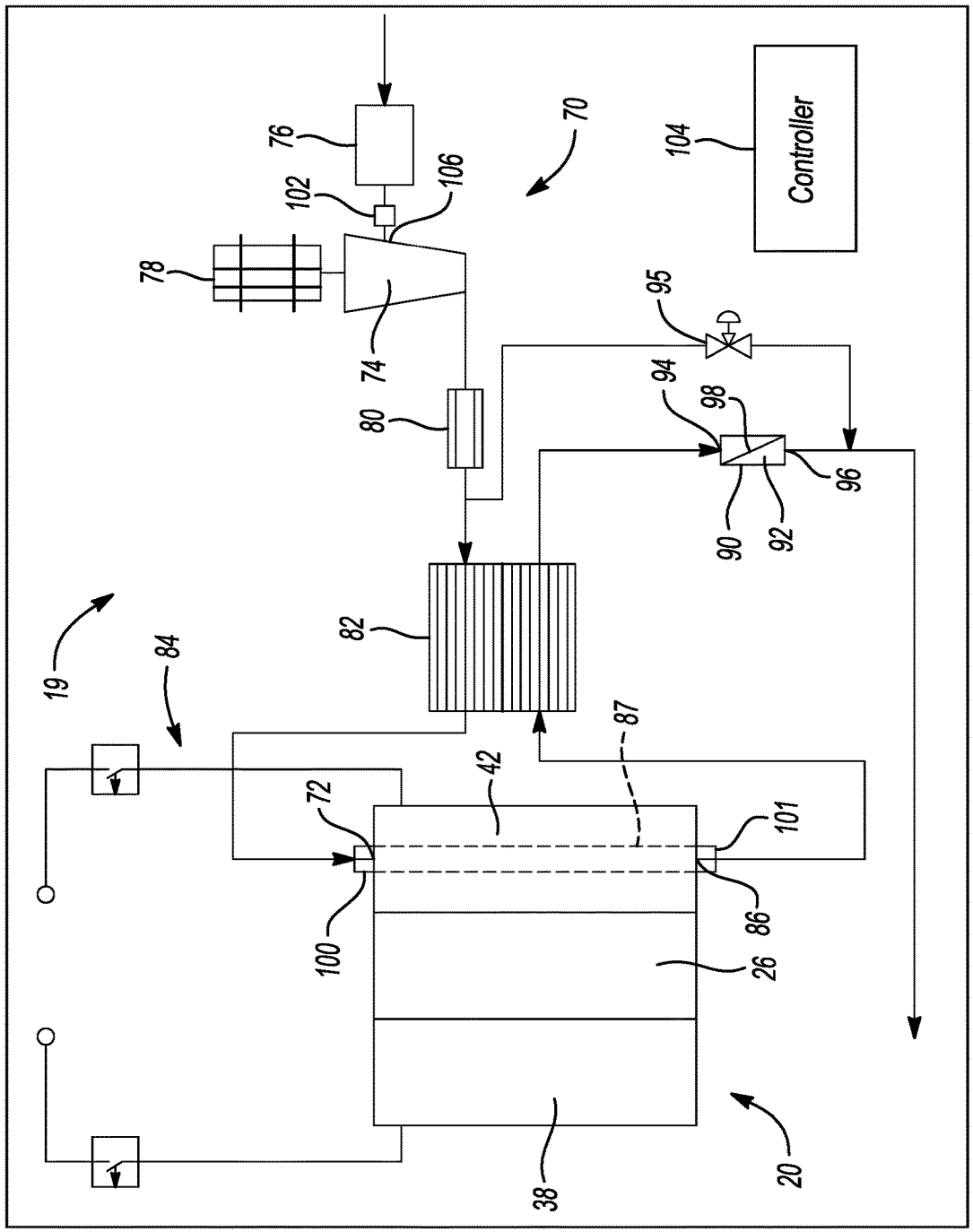
FIG. 3 is a schematic diagram of a fuel-cell system.

Referring to FIG. 3, the fuel-cell system 19 includes an air supply system 70 that delivers air to the stack inlet 72, which is in fluid communication with the air flow paths 87 of the cathode side 42. The air supply 70 includes an air compressor 74 that draws air from outside of the vehicle. The compressor 74 may be powered by an electric motor 78 or other power source. A filter 76 may be provided to clean the air. An intercooler 80 is provided to reduce the temperature of the air exiting the compressor 74. The compressed air then travels through a humidifier 82 and subsequently to the stack inlet 72. The fuel cell 20 includes a plurality of passageways 87 that connect the stack inlet 72 with the various cathodes 42 of the stack. The compressed air circulates through these cathodes 42 facilitating the chemical reactions to produce electricity that is captured by one or more circuits 84. The air exits the fuel cell 20 at a stack outlet 86. The air then passes through the wet side of the humidifier 82. A throttle valve 90 controls the flow rate (mass air flow) and/or pressure of the air through the fuel cell 20. The throttle valve 90 may include a body 92 defining an inlet 94 and an outlet 96. The inlet 94 receives air from the fuel cell 20 and the outlet 96 vents the air to the atmosphere. Within the body 92 is an actuatable member 98, e.g., a flap, a butterfly, a ball, or the like, that is movable to increase and decrease the size of the opening (orifice) through the throttle valve 90, which in turn regulates the mass air flow and/or the pressure through fuel cell 20.

The air supply 70 may include a pressure sensor 100 and a mass air flow sensor 102. The pressure sensor 100 and the mass air flow sensor 102 are in electric communication with a controller 104. The pressure sensor 100 may be located at or near the inlet 72 and is configured to output data indicative of the measured pressure at the inlet 72. The controller 104 is configured to receive the data and interpreted it as the measured pressure. The mass air flow sensor 102 may be located at or near an inlet 106 of the compressor 74. The sensor 102 is configured to output data indicative of the measured mass air flow at the compressor inlet. The controller 104 is configured to receive the data from the sensor 102 and interpreted as the measured mass air flow.

The controller 104, while illustrated as one controller, may be part of a larger control system and may be controlled by various other controllers throughout the vehicle, such as a vehicle system controller (VSC). It should therefore be understood that the controller 104 and one or more other controllers can collectively be referred to as a "controller" that controls various actuators in response to signals from various sensors to control functions such as operating the compressor 74 and the throttle valve 90. The controller 104 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 104 may communicate signals to and from the fuel cell, the compressor, the throttle valve, and various sensors. Although not explicitly illustrated, those of ordinary skill in the art will recognize various functions or components that may be controlled by the controller 104 within each of the subsystems identified above.

The air supply system 70 may be considered a multiple-input and multiple-output (MIMO) problem with two control inputs, compressor speed and throttle valve opening, and two control outputs, mass air flow and pressure at the inlet port 72. Considering the cross-coupled nature of these inputs and outputs, the challenge for the control design is to develop a robust algorithm that satisfies the system operating requirements while also remaining relatively simple to implement and calibrate.

As will be discussed in detail below, a novel decentralized internal model control (IMC) based air supply control strategy is used to control the flow of air through the cathode. It is a decentralized control strategy that utilizes the compressor to regulate the stack inlet pressure and the throttle valve to regulate the stack inlet mass air flow. In particular, the throttle valve control over the mass air flow leverages the IMC design logic, which may be based on a physics-based orifice model with key parameters directly identified from the system outputs. Since the controller is based on IMC, it requires much less calibration effort compared to a conventional PI-type controller. In addition, the proposed implementation allows the system to adapt the throttle valve controller to account for degradation and aging in the system. The compressor speed controller uses a PI-plus-feedforward design and its operation is coordinated with the throttle valve. The proposed air supply control strategy may significantly reduce the calibration efforts and improve the robustness of the system.

Figure 4:
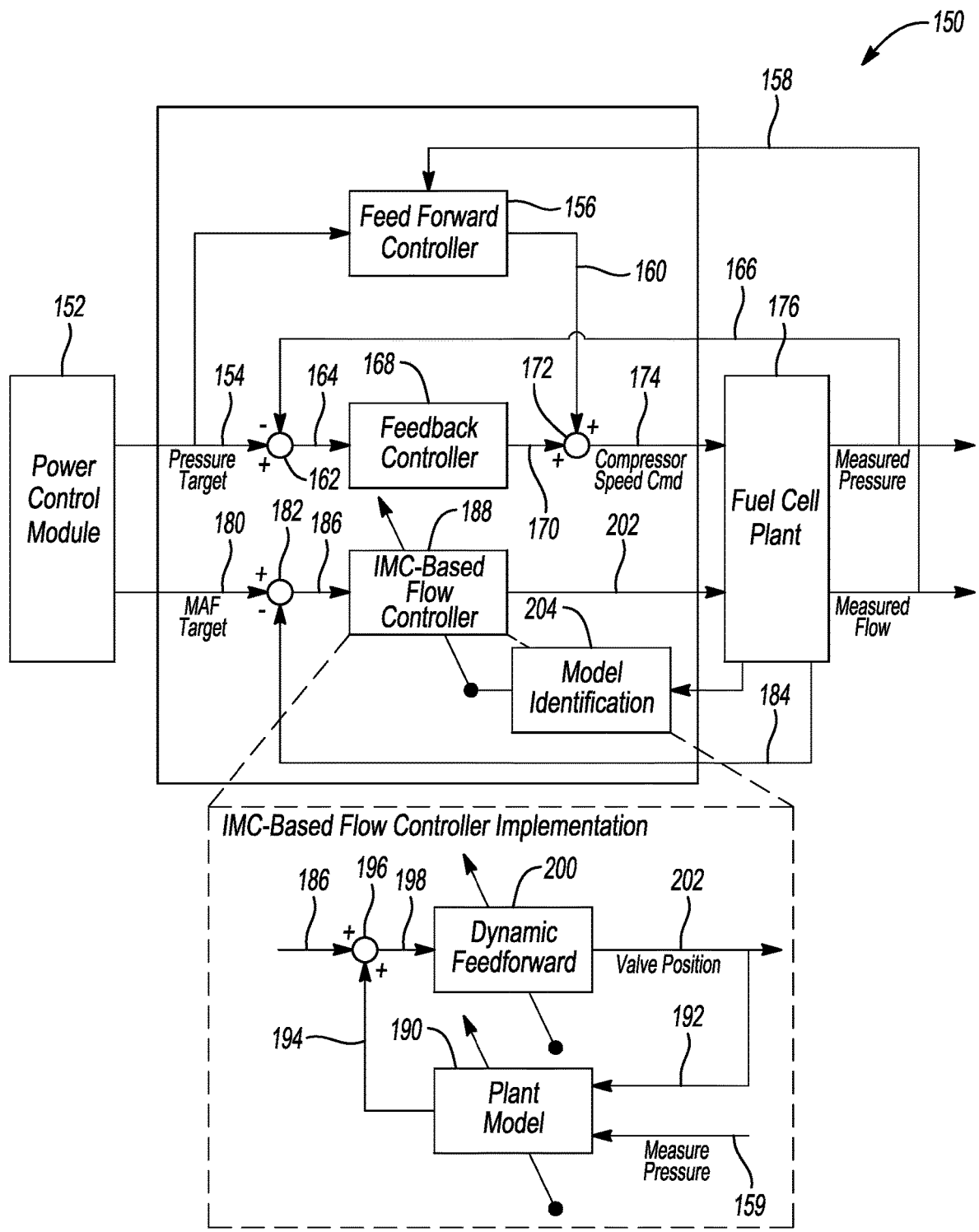
FIG. 4 is a control diagram of an algorithm for controlling the compressor and throttle valve of the fuel-cell system.

FIG. 4 illustrates a control diagram 150 for controlling the speed of the compressor and the opening of the throttle valve. The proposed controls are a decentralized IMC-based air path controller as illustrated in the block diagram of FIG. 4. In these controls, the compressor regulates the cathode inlet pressure via a closed loop feedback while an IMC-based throttle valve controller tracks the stack inlet port mass air flow target. The parameters in the IMC-based throttle valve control are adapted to the system output changes over time via model identification, which accounts for the noise factors such as aging and degradation.

The compressor speed is based on feedforward and feedback control. A power control module 152 is configured to receive data regarding the operation of the fuel cell 20 and other vehicle components and to determine a target pressure 154 and a target mass air flow (MAF) 180 for the air supply system 70. The target pressure 154 and the measured mass air flow 158, e.g., sensor 102, are fed to a feedforward controller 156. The feedforward controller 156 may include a lookup table that outputs a feedforward component compressor speed ($v_{comp}^{ff}$) based on the target pressure 154 and the measured mass air flow 158 as shown in equation 1. In equation 1, $v_{comp}^{ff}$ is a function of the pressure ratio across the compressor $$\left(\frac{p_{co}}{p_{amb}}\right)$$

with $p_{co}$ and $p_{amb}$ representing compressor outlet pressure, which is assumed to be the same as the pressure target 154, and ambient pressure, respectively, and the desired compressor inlet flow ($W_{ci}^{des}$). $W_{ci}^{des}$ is determined by equation 2, where $W_{si}^{des}$ represents the desired mass air flow at the fuel cell inlet port (MAF target 180) and $W_{leak}$ represents the air leakage through the air bearing of the compressor, which is a 1-dimensional look-up table of the stack inlet pressure ($p_{si}$).

$$v_{camp}^{ff} = f\left(\frac{p_{co}}{p_{amb}}, W_{ci}^{des}\right) \quad \text{(Eq. 1)}$$

$$W_{ci}^{des} = W_{si}^{des} + W_{leak} \quad \text{(Eq. 2)}$$

A difference between the target pressure 154 and the measured pressure 166, e.g., at sensor 100, is determined at summation block 162 to determine an error 164. The error 164 is fed to a feedback controller 168. The feedback controller 168 outputs a feedback component compressor speed 170 ($v_{comp}^{fb}$) based on the error 164. The feedback controller 168 may be a proportion integral (PI) controller. Equation 3 shows an example PI controller, where $v_{comp}^{fb}$ is a function of the tracking error of stack inlet pressure ($p_{si}^{err} = p_{si}^{target} - p_{si}$) as shown in equation 3, with $p_{si}^{target}$ representing the desired pressure at the stack inlet and $p_{si}$ representing the measured pressure. $K_p$ and $K_i$ represent the proportional and integral gains of the feedback control, respectively.

$$v_{comp}^{fb} = K_p \cdot p_{si}^{err} + K_i \cdot \int_0^t p_{si}^{err} \cdot dt \quad \text{(Eq 3)}$$

The feedforward component 160 and the feedback component 170 are summed at summation block 172 to determine a commanded compressor speed 174 that is sent to the fuel-cell plant 176, e.g., commanded to the motor of the compressor.

Internal model control is used to control the position of the throttle valve, e.g., valve 90. Internal model control is a model-based control structure that includes a dynamic-feedforward component and a model of the plant. The control-oriented model of the throttle valve may be used to develop such control strategy. For instance, an orifice flow model may be leveraged as shown from equation 4, where W represents the flow rate of the fluid mixture through the orifice (i.e., the opening of the throttle valve), $p_{in}$ and $p_{out}$ represent the pressure at the orifice inlet and outlet, respectively, A represents the equivalent flow area of the orifice, M and T represent the molar mass and temperature of the fluid mixture, respectively, and $R_u$ represents the universal gas constant.

$$W = p_{in} \cdot A \cdot \sqrt{\frac{2M}{R_u T}\left(\frac{p_{out}}{p_{in}} - \left(\frac{p_{out}}{p_{in}}\right)^2\right)}, \quad \text{(Eq. 4)}$$

Simplifying assumptions may be made with respect to Equation 4 so that it applies better to controlling the throttle valve. These assumptions may include: (1) under normal operation, the system bypass valve 95 is closed and the mass air flow through the throttle valve roughly equals the mass air flow at the inlet port; (2) throttle outlet pressure ($p_{out}$) and inlet pressure ($p_{in}$) can be approximated by the ambient pressure ($p_{amb}$) and the outlet port pressure ($p_{so}$) measured at the cathode outlet 86 by sensor 101, respectively, which may be measured sensor outputs; (3) fluid mixture temperature (T) roughly equals the measured stack outlet coolant temperature ($T_{so}$); (4) fluid mixture molar mass (M) is constant; and (5) equivalent flow area (A) is a linear function of the throttle valve opening command ($u_{tv}^{cmb}$) in percentage.

By applying the assumptions to Equation 4, the static mass air flow through the throttle valve ($W_{tv}^{ss}$) can be rewritten equivalently in a linear parametric form as equation 5, where the regressor $\Phi = p_{so} \cdot \sqrt{(PR - PR^2)/T_{so}}$, $PR = p_{amb}/$ $p_{so}$, and $\zeta_1$ and $\zeta_2$ are constant parameters to be identified using least square method from the system normal operation data.

$$W_{tv}^{ss} = \zeta_1 \cdot \Phi \cdot u_{tv}^{cmd} + \zeta_2 \cdot \Phi, \qquad \text{(Eq. 5)}$$

The estimated inlet port mass air flow ($W_{si}$) is used to approximate the actual mass air flow through the throttle ($W_{tv}$). $W_{si}$ is estimated by Equation 6, where $W_{ci}$ represents the mass air flow measured at the compressor inlet and the leakage $W_{leak}$ is the same as defined in Equation 2.

$$W_{si} = W_{ci} - W_{leak}, \qquad \text{(Eq. 6)}$$

To account for transient response in the system, a first-order filter $$\left( G(s) = \frac{a}{\tau s + b} \right)$$

is applied to static mass air flow ($W_{tv}^{ss}$) to model mass air flow through the throttle ($W_{tv}$), as shown in equation 7.

$$W_{tv} = W_{si} = \frac{a}{\tau s + b} W_{tv}^{ss}. \qquad \text{(Eq. 7)}$$

Then a recursive least square method may be used to estimate a, b, and $\tau$. The plant model can be implemented as equation 8, where $W_{tv}^{model}$ is the model output flow, $W_{tv}^{ss,model}$ is the steady state model output flow, and $u_{tv}^{cmd}$ is the command of the throttle valve opening.

$$W_{tv}^{model} = \frac{a}{\tau s + b} W_{tv}^{ss,model} = \frac{a}{\tau s + b} (\zeta_1 \cdot \Phi \cdot u_{tv}^{cmd} + \zeta_2 \cdot \Phi), \qquad \text{(Eq. 8)}$$

With the model shown in Equation 8, the dynamic feedforward can be implemented as a model inverse appended with a filter $$\frac{1}{\tau_{IMC} s + 1},$$

where $T_{IMC}$ is a calibratable time constant. The detailed implementation is shown below in equations 9 and 10, where $W_{si}^{des}$ is desired mass air flow at the inlet port.

$$u_{tv}^{cmd} = \frac{W_{tv}^{ss,cmd} - \zeta_2 \cdot \Phi}{\zeta_1 \cdot \Phi}, \qquad \text{(Eq. 9)}$$

$$W_{tv}^{ss,cmd} = \frac{\tau s + b}{a(\tau_{IMC} s + 1)} (W_{si}^{des} - W_{si} + W_{tv}^{model}), \qquad \text{(Eq. 10)}$$

The above-described equations will now be described in conjunction with the control diagram 150. At summation block 182, an error 186 is calculated between the target mass air flow 180 and a first estimated mass air flow 184 through the throttle valve. The estimated mass air flow 184 is based on a measured mass air flow, e.g., sensor 102, and is derived using equation 6. The error 186 is fed to an IMC-based flow controller 188. The IMC-based controller 188 includes a plant model 190 that receives the measured pressure 159 at the cathode outlet 86 and the throttle position 192 of the previous control loop. The plant model 190 is configured to output a second estimated mass air flow 194 of the throttle valve. The plant model may utilize equations 4 and 5 discussed above to determine the second estimated mass air flow 194. The error 186 is summed with the second estimated mass air flow 194 at summation block 196. The summation 198 is fed to the dynamic feedforward box 200. The dynamic feedforward box 200 determines a commanded throttle valve position 202, such as using equation 9. The commanded throttle valve position is sent to the fuel-cell plant 176 which controls the actuator associated with the throttle valve to increase and decrease the orifice size.

The controls 150 also include a model identification block 204 configured to adjust the IMC-based controller 188 parameters ($\zeta_1$, $\zeta_2$, a, b, and $\tau$) to account for the noise factors such as aging and degradation. For example, the throttle valve may acquire buildup over time which affects the orifice size or the response of throttle valve low-level actuator slows down over time due to aging. The model identification 204 may adjust the gains of the dynamic feedforward controller 200 and adjust the parameters of the plant model, for example. This allows the system to function accurately over the life of the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a fuel cell including an air inlet port and an air outlet port;
    an air supply system including a compressor connected in fluid communication with the inlet port and a throttle valve connected in fluid communication with the outlet port;
    a mass air flow sensor in electric communication with the controller and located upstream of the compressor, wherein the mass air flow sensor is configured to output data indicative of the measured mass air flow; and
    a controller programmed to change a position of the throttle valve based on a target mass air flow, the measured mass air flow, a measured pressure, and the position of the throttle valve.

2. The vehicle of claim 1, wherein the controller is further programmed to command a speed to the compressor based on a feedforward component derived from the measured mass air flow and a target pressure.

3. The vehicle of claim 2, wherein commanding a speed to the compressor is further based on a feedback component derived from an error between the target pressure and the measured pressure.

4. The vehicle of claim 3, wherein the speed commanded to the compressor is a summation of the feedforward component and the feedback component.

5. The vehicle of claim 1 further comprising a pressure sensor in electric communication with the controller and located at the inlet port, wherein the pressure sensor is configured to output data indicative of the measured pressure.

6. The vehicle of claim 1, wherein the fuel cell further includes an anode side, a cathode side, and a membrane electrode assembly therebetween, wherein the cathode side has an internal air path in fluid communication with the inlet and outlet ports.

7. A vehicle comprising:
a fuel cell including an air inlet port and an air outlet port;
an air supply system including a compressor connected in fluid communication with the inlet port and a throttle valve connected in fluid communication with the outlet port; and
a controller programmed to:
command a speed to the compressor based on (i) a feedforward component derived from a measured mass air flow and a target pressure and (ii) a feedback component derived from an error between the target pressure and a measured pressure, and
command a valve position to the throttle valve based on a dynamic feedforward component derived from a summation of (i) an error between a target mass air flow and a first estimated mass air flow and (ii) a second estimated mass air flow, wherein the first estimated mass air flow is based on the measured mass air flow, and the second estimated mass air flow is based on the measured pressure and the valve position.

8. The vehicle of claim 7, wherein the measured mass air flow is at an inlet of the compressor.

9. The vehicle of claim 8 further comprising a mass air flow sensor in electric communication with the controller and configured to output data indicative of the measured mass air flow.

10. The vehicle of claim 7, wherein the measured pressure is at the inlet port.

11. The vehicle of claim 10 further comprising a pressure sensor in electric communication with the controller and configured to output data indicative of the measured pressure.

12. The vehicle of claim 7, wherein the measured mass air flow is at an inlet of the compressor, and the measured pressure is at the inlet port.

13. The vehicle of claim 7, wherein the speed commanded to the compressor is a summation of the feedforward component and the feedback component.

14. The vehicle of claim 7, wherein the controller is further programmed to adapt the second estimated mass air flow based on aging of the throttle valve.

15. The vehicle of claim 7, wherein the controller is further programmed to adapt the valve position based on aging of the throttle valve.

16. The vehicle of claim 7, wherein the fuel cell further includes an anode side, a cathode side, and a membrane electrode assembly therebetween, wherein the cathode side has an internal air path in fluid communication with the inlet and outlet ports.

17. A method of controlling air flow through a cathode side of a fuel cell, the method comprising:
commanding a speed to a compressor that circulates air through the cathode, the speed being based on (i) a feedforward component derived from a measured mass air flow and a target pressure and (ii) a feedback component derived from an error between the target pressure and a measured pressure; and
commanding a valve position to a throttle valve, that controls mass air flow through the cathode side, based on a dynamic feedforward component derived from a summation of (i) an error between a target mass air flow and a first estimated mass air flow and (ii) a second estimated mass air flow, wherein the first estimated mass air flow is based on the measured mass air flow, and the second estimated mass air flow is based on the measured pressure and the valve position.

18. The method of claim 17, wherein the measured mass air flow is at an inlet of the compressor, and the measured pressure is at the inlet.

* * * * *